G. C. Smith,
Rubber Hose.

No. 99,018.  Patented Jan. 18, 1870.

United States Patent Office.

GEORGE C. SMITH, OF FISHKILL, NEW YORK, ASSIGNOR TO NEW YORK RUBBER COMPANY.

Letters Patent No. 99,018, dated January 18, 1870.

IMPROVEMENT IN RUBBER HOSE.

The Schedule referred to in these Letters Patent and making part of the same.

*To whom it may concern:*

Be it known that I, GEORGE C. SMITH, of Fishkill, in the county of Dutchess, and State of New York, have invented certain new and useful Improvements in Vulcanized India-Rubber Hose; and I hereby declare the following to be a full, clear, and exact description of the same, reference being had to the accompanying drawings, in which—

Figure 1:
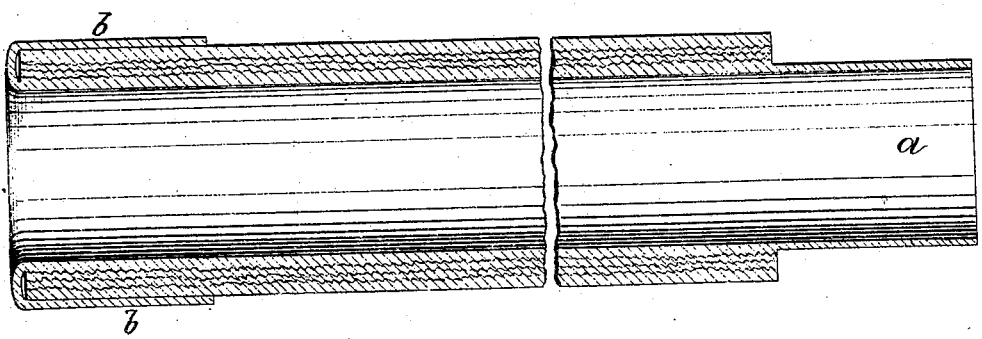
Figure 2:
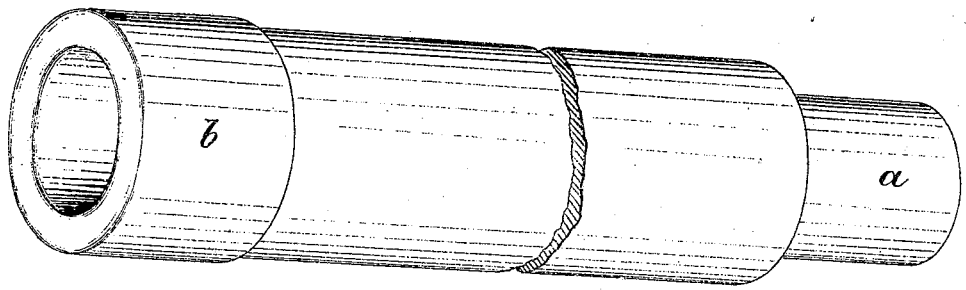

Figure 1 is a longitudinal central section through a section of hose made in accordance with my invention, and Figure 2 is a perspective view of the same.

My invention is designed for the protection of the ends of vulcanized India-rubber hose, and is intended to furnish a ready and convenient means for protecting such ends, which is made in one piece with and forms part of the hose, and which at the same time can be at any time turned over upon, or removed from the ends, so as to either cover or expose them to view, as desired.

It is well known that "rubber hose," so called, composed of alternate layers or plies of canvas and India rubber vulcanized together, is ordinarily exposed at the ends, and, that owing to this exposure, the canvas plies are apt to absorb water or moisture, which in time rots the canvas and weakens the hose.

Efforts have heretofore been made to remove this difficulty by covering the exposed parts of the hose in various ways. Water-proof caps have been made to fit the ends, and they have also been covered by rubber in the green or plastic state, which is then vulcanized, together with the body of the hose.

This latter mode is defective, however, for the reason, among others, that as the ends of the hose are covered, there is no way to ascertain the quality of the hose, or the number of plies of canvas which enter into its composition.

My invention is designed to combine in itself the advantages which both of the modes above named may be considered to possess; and to this end, It consists in forming the cap for the ends from the lining, or inner coating of vulcanized rubber of the hose, this lining projecting in cylindrical form a suitable distance to admit of its being drawn over the hose-ends whenever desired.

In the drawings, the hose is represented as composed of a suitable number of plies of canvas alternating with layers of rubber, the inner layer or hose-lining being rubber. In making the hose, I extend this inner lining beyond the body of the hose the required distance to enable it to serve as a cap for the ends, as shown at *a*. There is thus provided, at each end of the hose-section, an elastic cylinder, which is the continuation of and forms part of the inner coating or lining of the hose. This cylinder is turned backward, or inside out, and drawn over the end of the hose until it is stretched tightly over the body of the hose, and effectually covers and protects the end, as shown at *b*. At the same time, whenever desired, if, for instance, it is desired to ascertain the quality of the hose, the cap can be drawn back again, so as to uncover the end and leave it exposed to view, and I thus combine with the hose a cap, which, while in one piece with the body of the hose, can be removed from or applied to the ends with the utmost facility.

Having now described my invention, and the manner in which the same is or may be carried into effect,

What I claim, and desire to secure by Letters Patent, is—

As a new manufacture, vulcanized India-rubber hose, the inner elastic lining of which is extended beyond the body of the hose, so as to form a removable cap for the ends of the same, substantially as shown and set forth.

In testimony whereof, I have signed my name to this specification, before two subscribing witnesses.

GEORGE C. SMITH.

Witnesses:
DANIEL HAMOND,
CHARLES A. DUBOIS.